United States Patent
Carter et al.

(10) Patent No.: US 8,707,370 B2
(45) Date of Patent: Apr. 22, 2014

(54) DIGITAL SATELLITE BROADCAST PROGRAM DISTRIBUTION OVER MULTICAST IP BROADBAND NETWORKS

(75) Inventors: Gary Carter, Kanata (CA); Bastian Stassen, Ottawa (CA)

(73) Assignee: International Datacasting Corporation, Kanata (CA)

( * ) Notice: Subject to any disclaimer, the term of this patent is extended or adjusted under 35 U.S.C. 154(b) by 0 days.

(21) Appl. No.: 13/548,926

(22) Filed: Jul. 13, 2012

(65) Prior Publication Data
US 2014/0020019 A1    Jan. 16, 2014

(51) Int. Cl.
H04N 21/236 (2011.01)
H04N 21/434 (2011.01)
H04N 21/61 (2011.01)

(52) U.S. Cl.
CPC ......... *H04N 21/6143* (2013.01); *H04N 21/236* (2013.01); *H04N 21/434* (2013.01)
USPC .............................................. 725/63; 725/39

(58) Field of Classification Search
USPC .......................................................... 725/39
See application file for complete search history.

(56) References Cited

U.S. PATENT DOCUMENTS

| | | | | |
|---|---|---|---|---|
| 6,609,144 B1* | 8/2003 | Inoue et al. | ................... | 718/100 |
| 6,622,307 B1* | 9/2003 | Ho | ............................... | 725/120 |
| 7,409,702 B2* | 8/2008 | Cao | ................................ | 725/110 |
| 7,908,627 B2* | 3/2011 | Ansari et al. | ..................... | 725/90 |
| 7,934,009 B2 | 4/2011 | Perrot | | |
| 8,001,574 B2* | 8/2011 | Hicks et al. | ...................... | 725/82 |
| 8,087,047 B2* | 12/2011 | Olague et al. | ................... | 725/39 |
| 8,132,215 B2* | 3/2012 | Tanaka et al. | ................... | 725/71 |
| 8,248,936 B2* | 8/2012 | Kantawala et al. | ........... | 370/232 |
| 8,289,997 B2* | 10/2012 | Evans et al. | ................... | 370/474 |
| 8,302,140 B2* | 10/2012 | Pedlow et al. | ................... | 725/95 |
| 2001/0047419 A1* | 11/2001 | Gonno et al. | ................. | 709/229 |
| 2002/0061021 A1* | 5/2002 | Dillon | ........................... | 370/390 |
| 2002/0061029 A1* | 5/2002 | Dillon | ........................... | 370/432 |
| 2002/0126702 A1* | 9/2002 | Vince et al. | ................... | 370/485 |
| 2003/0035486 A1* | 2/2003 | Kato et al. | ............... | 375/240.26 |

(Continued)

FOREIGN PATENT DOCUMENTS

WO    WO 2008/114936 A1    9/2008
WO    WO 2010/024580 A2    3/2010

OTHER PUBLICATIONS

Horst D. Clausen et al., "MPEG-2 as a Transmission System for Internet Traffic", Institute for Computing Sciences and Systems Analysis, 1998, pp. 101-107.

(Continued)

*Primary Examiner* — Nasser Goodarzi
*Assistant Examiner* — Michael B Pierorazio
(74) *Attorney, Agent, or Firm* — Crowell & Moring LLP

(57) ABSTRACT

Systems and methods for distributing digital satellite broadcast programs over multicast Internet Protocol (IP) networks are provided. A satellite receiver gateway receives a signal from a digital satellite broadcast and generates service information multicast packets that are transmitted over a multicast IP network. A device receives the service information multicast packets and generates a channel list or electronic program guide for a user. When a user selects a service from the channel list or electronic program guide the device sends a service request for the service towards the satellite receiver gateway. Either the satellite receiver gateway or a switch within the multicast IP network can then transmit the service in multicast IP packets to the requesting device.

18 Claims, 8 Drawing Sheets

(56) References Cited

U.S. PATENT DOCUMENTS

| | | | |
|---|---|---|---|
| 2003/0206554 A1* | 11/2003 | Dillon | 370/432 |
| 2004/0022104 A1* | 2/2004 | Inoue et al. | 365/202 |
| 2004/0090970 A1* | 5/2004 | Sanchez et al. | 370/397 |
| 2004/0143851 A1* | 7/2004 | Bergstrand | 725/131 |
| 2004/0187161 A1* | 9/2004 | Cao | 725/110 |
| 2005/0044142 A1 | 2/2005 | Garrec et al. | |
| 2005/0055714 A1* | 3/2005 | Lee | 725/54 |
| 2005/0071873 A1* | 3/2005 | Nguyen | 725/50 |
| 2005/0091697 A1* | 4/2005 | Tanaka et al. | 725/131 |
| 2006/0083263 A1* | 4/2006 | Jagadeesan et al. | 370/487 |
| 2006/0115083 A1* | 6/2006 | Candelore et al. | 380/216 |
| 2006/0153379 A1* | 7/2006 | Candelore et al. | 380/216 |
| 2006/0235993 A1 | 10/2006 | Gervais et al. | |
| 2006/0262926 A1* | 11/2006 | Candelore et al. | 380/200 |
| 2006/0269060 A1* | 11/2006 | Candelore et al. | 380/239 |
| 2006/0269225 A1* | 11/2006 | Tada | 386/95 |
| 2008/0046878 A1* | 2/2008 | Anderson | 717/168 |
| 2010/0146539 A1* | 6/2010 | Hicks et al. | 725/31 |
| 2010/0316122 A1* | 12/2010 | Chen et al. | 375/240.12 |
| 2010/0316134 A1* | 12/2010 | Chen et al. | 375/240.25 |
| 2011/0107379 A1* | 5/2011 | Lajoie et al. | 725/87 |
| 2011/0307921 A1* | 12/2011 | Zenoni | 725/32 |
| 2012/0039309 A1* | 2/2012 | Evans et al. | 370/338 |
| 2012/0137327 A1* | 5/2012 | Terakado et al. | 725/44 |
| 2012/0144445 A1* | 6/2012 | Bonta et al. | 725/116 |
| 2012/0167152 A1* | 6/2012 | Pedlow et al. | 725/95 |

OTHER PUBLICATIONS

"Digital Video Broadcasting (DVB); Specification for Service Information (SI) in DVB Systems", European Standard, ETSI EN 300 468 v1.4.1, (Nov. 2000), pp. 1-83.

Written Opinion dated Oct. 9, 2013 (6 pages).

International Search Report dated Oct. 9, 2013 (4 pages).

* cited by examiner

DIGITAL SATELLITE BROADCAST PROGRAM DISTRIBUTION OVER MULTICAST IP BROADBAND NETWORKS

BACKGROUND OF THE INVENTION

The manner of distributing video depends upon the type of system from which the video originates. Digital cable systems typically distribute video using standards-based techniques, such as the Data Over Cable Service Interface Specification (DOCSIS) standard. Digital video broadcast (DVB) satellite systems operate in a different manner than regular cable systems, and accordingly use different techniques for distribution of video. One technique for Direct-to-Home (DTH) service operators to distribute DVB satellite programs to multi-dwelling units (MDUs) in a building involves a satellite receiver that decodes and decrypts the DVB satellite programs and retransmits the programs as modulated channels on coaxial cable. Another technique for DTH operators to distribute DVB satellite programs is to downconvert the DVB satellite signals and distribute them over coaxial cable to receivers that demodulate and demultiplex the signals in order to reproduce a program. These techniques require coaxial cable, line amplifiers, and switches, which increase the cost of the distribution system and the number of points of failure. Further, the decryption of the first technique defeats the security systems applied to the programs, and thus jeopardizes the revenue stream due to free-riders that receive the signals but do not pay for them.

SUMMARY OF THE INVENTION

There are currently standards that provide an alternative to the use of coaxial cable for DVB satellite programs. These standards allow the transmission of the DVB satellite programs over Internet Protocol (IP) multicast networks using multicast packets. These standards are excessively complex and computationally expensive, which increase the overall cost of a DVB satellite distribution system. For example, in these types of systems the client premise equipment has no advance knowledge of the services available from the DVB satellite. Accordingly, when the client premise equipment is first powered on it must send a request for the information about the available services to a satellite receiver gateway, and then send a request for the service itself to the satellite receiver gateway. Furthermore, the client premise equipment must receive an identification of the multicast address and port number used for the requested service from the satellite receiver gateway.

Exemplary embodiments of the present invention provide systems and methods for distributing digital satellite broadcast programs over multicast Internet Protocol (IP) networks that overcome the above-identified and other deficiencies of conventional techniques. In accordance with the present invention a satellite receiver gateway receives a signal from a digital satellite broadcast and generates service information multicast packets that are transmitted over a multicast IP network. A device receives the service information multicast packets and generates a channel list or electronic program guide for a user. When a user selects a service from the channel list or electronic program guide the device sends a service request for the service towards the satellite receiver gateway. Either the satellite receiver gateway or a switch within the multicast IP network can then transmit the service in multicast IP packets to the requesting device.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
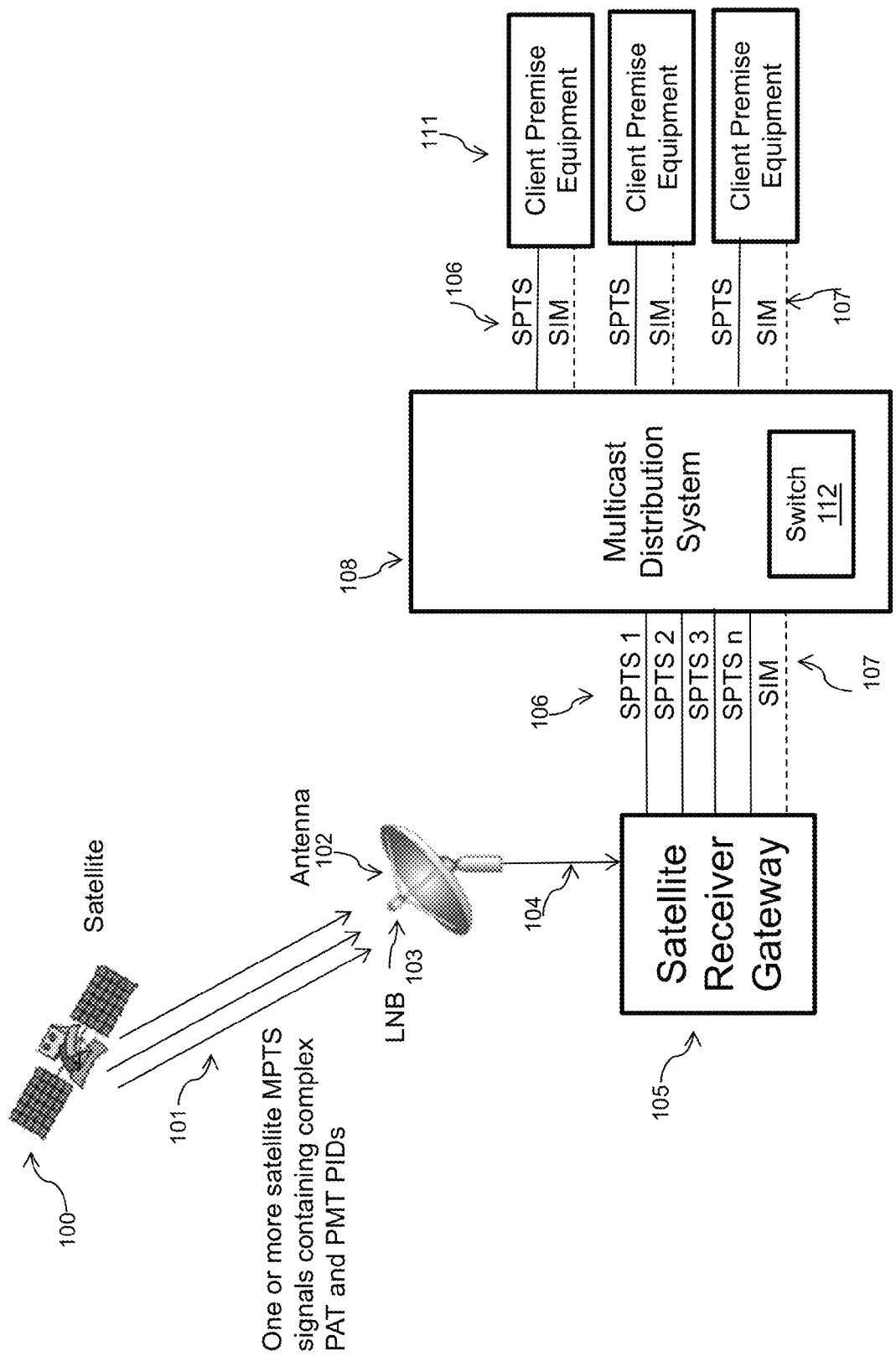
FIG. 1 is a block diagram of an exemplary system in accordance with the present invention.

FIG. 1 is a block diagram of an exemplary system in accordance with the present invention. A satellite 100 transmits microwave signals 101 that include one or more Multiple Program Transport Streams (MPTS) signals, each of which is comprised of a number of packets that include a Packet Identification (PID), a complex Program Allocation Table (PAT) and a complex Program Mapping Table (PMT). These signals are received by a satellite antenna 102 using is low noise block downconverter 103, which downconverts the microwave frequency signals to radio frequency signals in, for example, the L-band. The downconverted signals are provided to satellite receiver gateway 105 over coaxial cable 104.

The satellite receiver gateway 105 process the satellite signals and generates multicast IP packets that include Service Program Transport Streams (SPTS) 106 for each individual program and multicast IP packets that include Service Information Multicast (SIM) information 107. The SPTS and SIM multicast packets are transmitted from the satellite receiver gateway 105 to client premise equipment 111 over a multicast distribution system 108, which is an internet protocol (IP) local area network. Multicast distribution system 108 includes switch 112, which receives the SPTS 106 for each individual program and the SIM 107, and forwards the SIM 107 to each client premise equipment 111 and particular SPTSs to the client premise equipment 111 that requested a service corresponding to the particular SPTS. The multicast distribution system 108 can employ any type of IP local area network technology, including wired Ethernet, wired optical technology (e.g., Gigabit Passive Optical Network (GPON), Ethernet Passive Optical Network (EPON), Broadband Passive Optical Network (BPON), technology), and any type of broadband wireless technology (e.g., so-called 3G and 4G wireless technology). Accordingly, switch 112 will be an appropriate type of switch for the particular type of local area network technology. Although FIG. 1 illustrates that the multicast distribution system 108 includes a single switch 112, the multicast distribution system 108 can include more than one such switch. Additionally, the multicast distribution system 108 and client premise equipment 111 can be part of a building that includes multi dwelling units (MDUs) or can be part of a larger system that serves a number of buildings.

Figure 2:
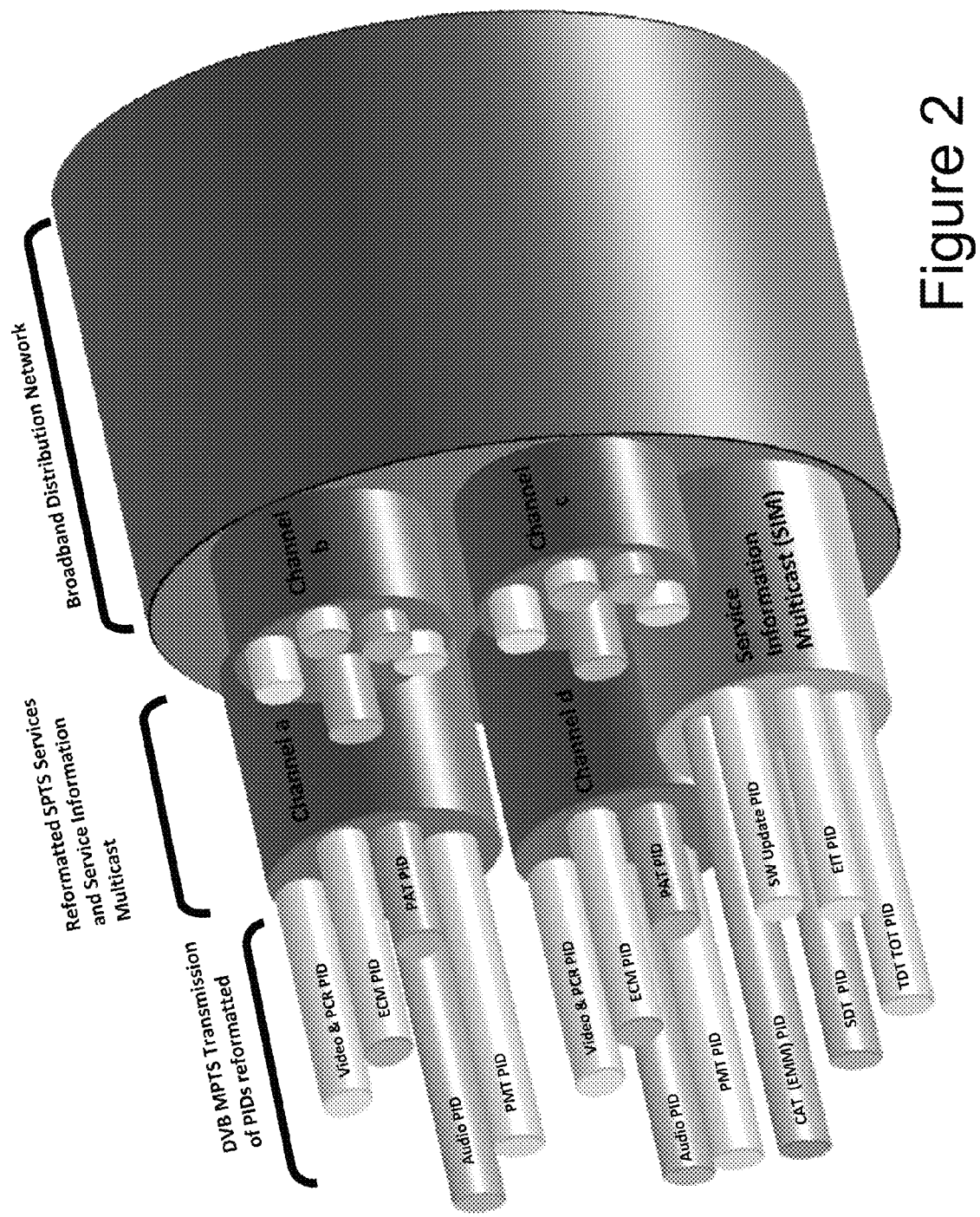
FIG. 2 is a schematic diagram of the distribution of DVB satellite programs over a multicast IP network in accordance with exemplary embodiments of the present invention.

FIG. 2 is a schematic diagram of the distribution of DVB satellite programs over a multicast IP network in accordance with exemplary embodiments of the present invention. As illustrated in FIG. 2, broadband distribution network carries multicast packets for the Service Information Multicast (SIM), as well as a number of channels that are multicast packets that carry SPTS services. Each channel includes a plurality of multicast packets that carry (1) video and a Program Clock Reference (PCR), (2) audio, (3) Electronic Control Messages (ECM), (4) a simplified Program Allocation Table (PAT), and (5) a Program Management Table (PMT), each of which is identified by a particular packet identification (PID) identifying the particular channel.

The Service Information Multicast (SIM) is comprised of a plurality of multicast packets that carry (1) a Conditional Access Table (CAT), (2) Service Description Table (SDT), (3) Event Information Table (EIT), (4) Time Date Table (TDT), (5) Time Offset Table (TOT), (6) software update data, and (7) any other relevant data, each of which is identified by a particular PID. As will be described in more detail below, each channel and the SIM are assigned a predetermined multicast IP address and port for communication over the multicast distribution system.

Figure 3:
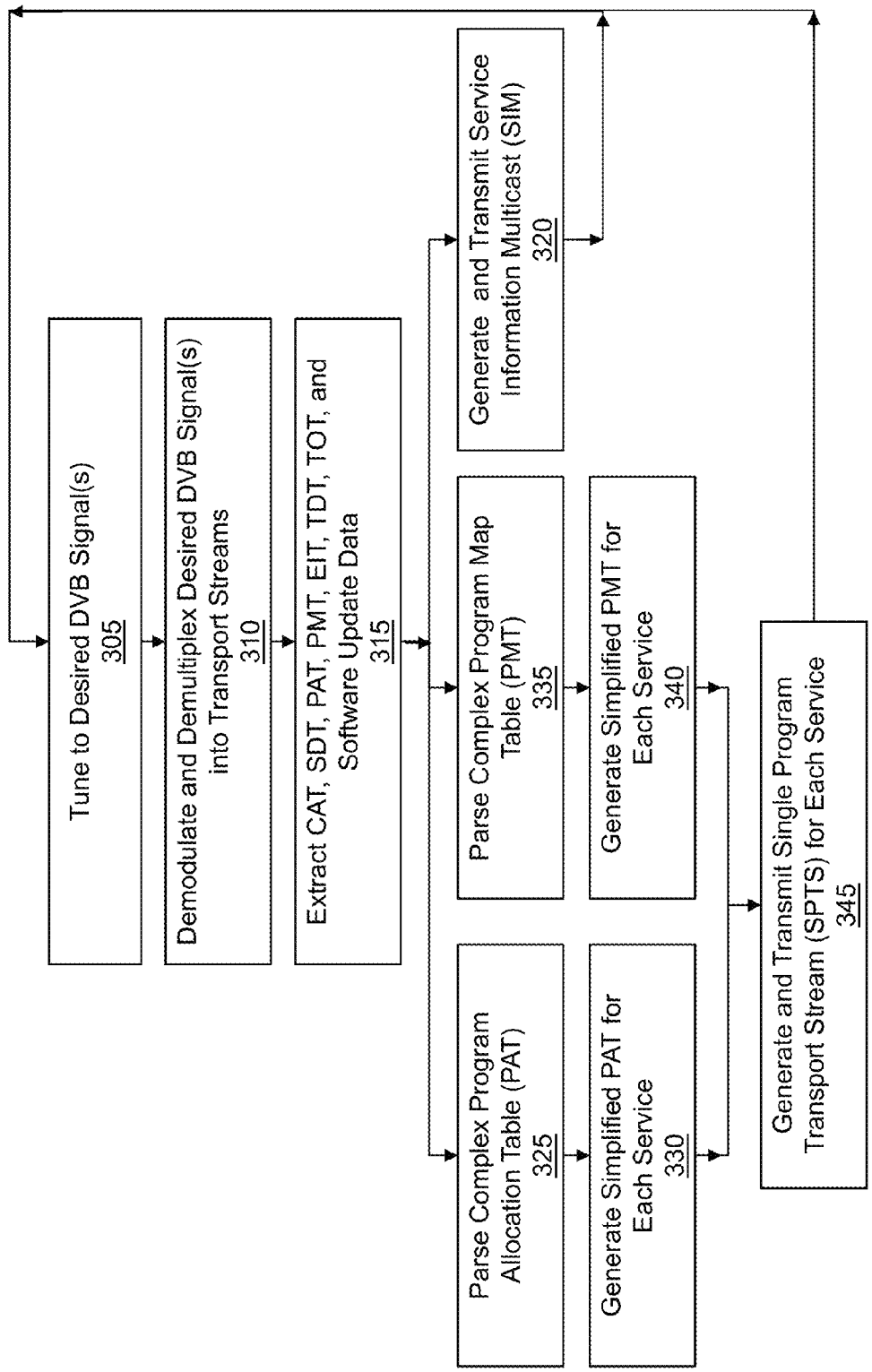
FIG. 3 is a flow diagram of an exemplary method for a satellite receiver gateway in accordance with the present invention.
Figure 4:
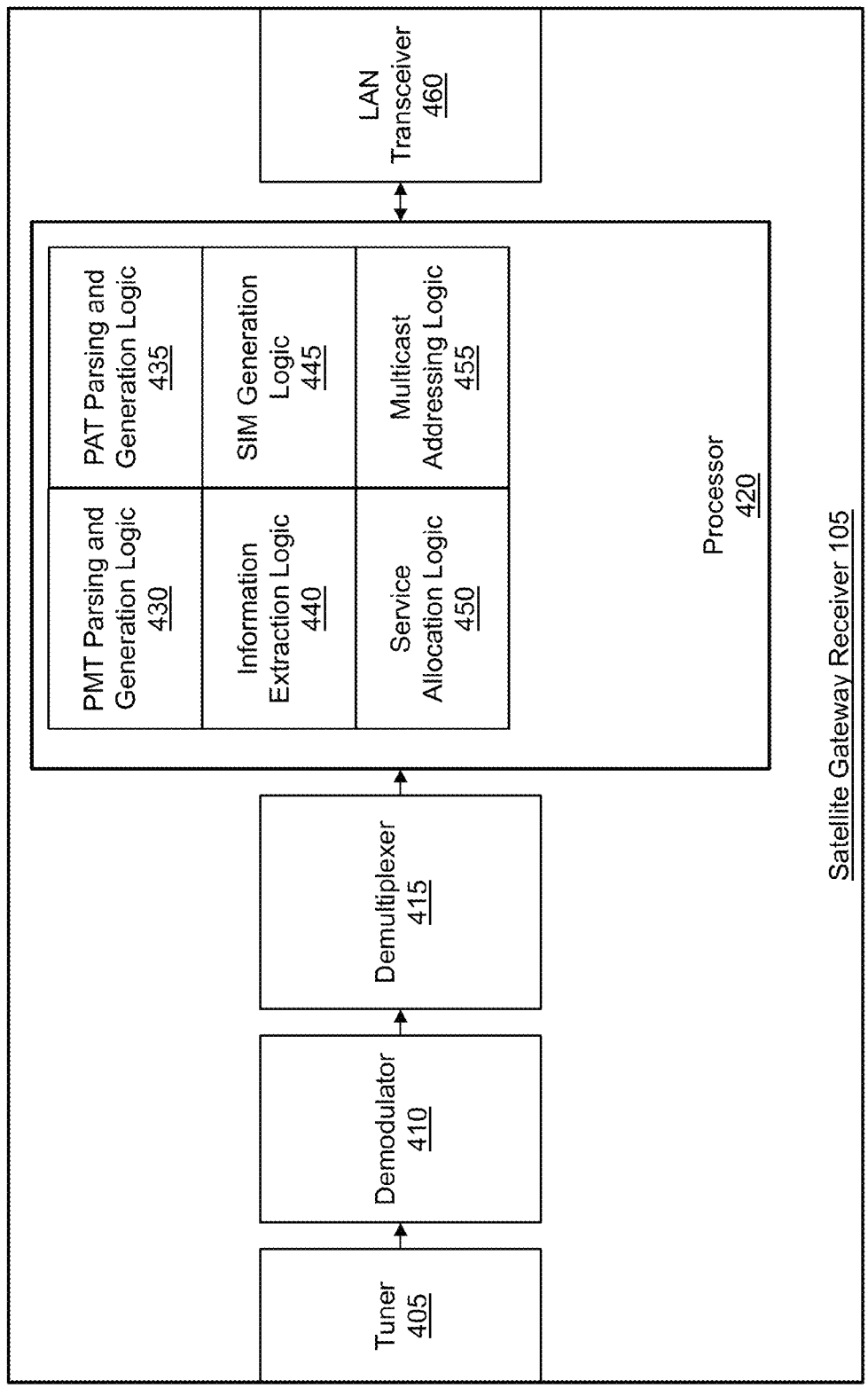
FIG. 4 is a block diagram of an exemplary satellite receiver gateway in accordance with the present invention.

FIG. 3 is a flow diagram of an exemplary method for a satellite receiver gateway in accordance with the present invention and FIG. 4 is a block diagram of an exemplary satellite receiver gateway in accordance with the present invention. Initially, tuner 405 of satellite receiver gateway 105 tunes to a desired DVB signal (step 305). If there are multiple desired satellite signals, then each of these signals are tuned to and processed in the manner described below. The tuned signal is demodulated by demodulator 410 and the transport streams are demultiplexed by demultiplexer 415 (step 310). The demultiplexed transport streams contain streams of packets that are differentiated by packet identifications (PIDs), each PID corresponding to a different channel or program being carried on the DVB satellite signal.

The transport streams are then provided to processor 420, which can be a microprocessor, application specific integrated circuit (ASIC), and/or a field programmable gate array (FPGA). When processor 420 is a microprocessor the various logic illustrated in FIG. 4 can be computer code stored in a non-transitory memory (not illustrated) that is loaded into the microprocessor.

Logic 440 of processor 420 extracts the Conditional Access Table (CAT), Service Description Table (SDT), complex Program Allocation Table (PAT), complex Program Management Table (PMT), Event Information Table (EIT), Time Date Table (TDT), Time Offset Table (TOT), software update data, and any other relevant data from one of the demultiplexed transport streams (step 315). Logic 445 then generates and transmits the service information multicast (SIM) multicast packets to the multicast distribution system 108 using local area network (LAN) transceiver 460 (step 320). As discussed above, SIM multicast packets carry the CAT, SDT, EIT, TDT, TOT, software update data, as well as any other relevant data. The SIM multicast packets are transmitted without being requested by the client premise equipment, and accordingly can be considered as unsolicited multicast packets.

At approximately the same time, program allocation table (PAT) logic 435 parses the complex PAT in the demultiplexed transport streams (step 325) and generates a simplified PAT for each requested service (step 330), and Program Map Table (PMT) parsing and generation logic 430 parses the complex PMT in the demultiplexed transport streams (step 335) and generates a simplified PMT for each requested service (step 340). Logic 450 then allocates the video, audio, Program Clock Reference (PCR), and Electronic Control Messages (ECM) corresponding to each service, and generates and transmits a Single Program Transport Stream (SPTS) for each service using LAN transceiver 460 (step 345). Again, as illustrated in FIG. 2, each SPTS corresponds to a channel or program that uses the same PID, and carries carry video, a Program Clock Reference (PCR), audio, Electronic Control Messages (ECM), a simplified Program Allocation Table (PAT), and a Program Management Table (PMT).

Prior to transmission, multicast addressing logic 455 assigns an IP address and port number for the packets corresponding to a requested service using an algorithm that is known to both the satellite receiver gateway 105 and the client premise equipment 111. This can be achieved by programming the client premise equipment during manufacture or by programming using a software update once the client premise equipment is deployed. One exemplary algorithm for determining the multicast address and port numbers is as follows:

IP: 235.1.0.0+(program ID) (using octal arithmetic)
Port: 1024+(program ID) (using decimal arithmetic)

Using this exemplary algorithm program #1 will be multicast on IP/Port 235.1.0.1/1025 and program #500 (0x01f4) will be multicast on IP/Port 235.1.1.244/1524. It should be recognized that this algorithm is merely one exemplary algorithm and that other can be used without departing from the scope of this invention. Furthermore, it should be recognized that in the present invention the three digits of most significant octet of the IP address can be any value within the range allocated for multicast packets, which is 224-235.

Figure 5:
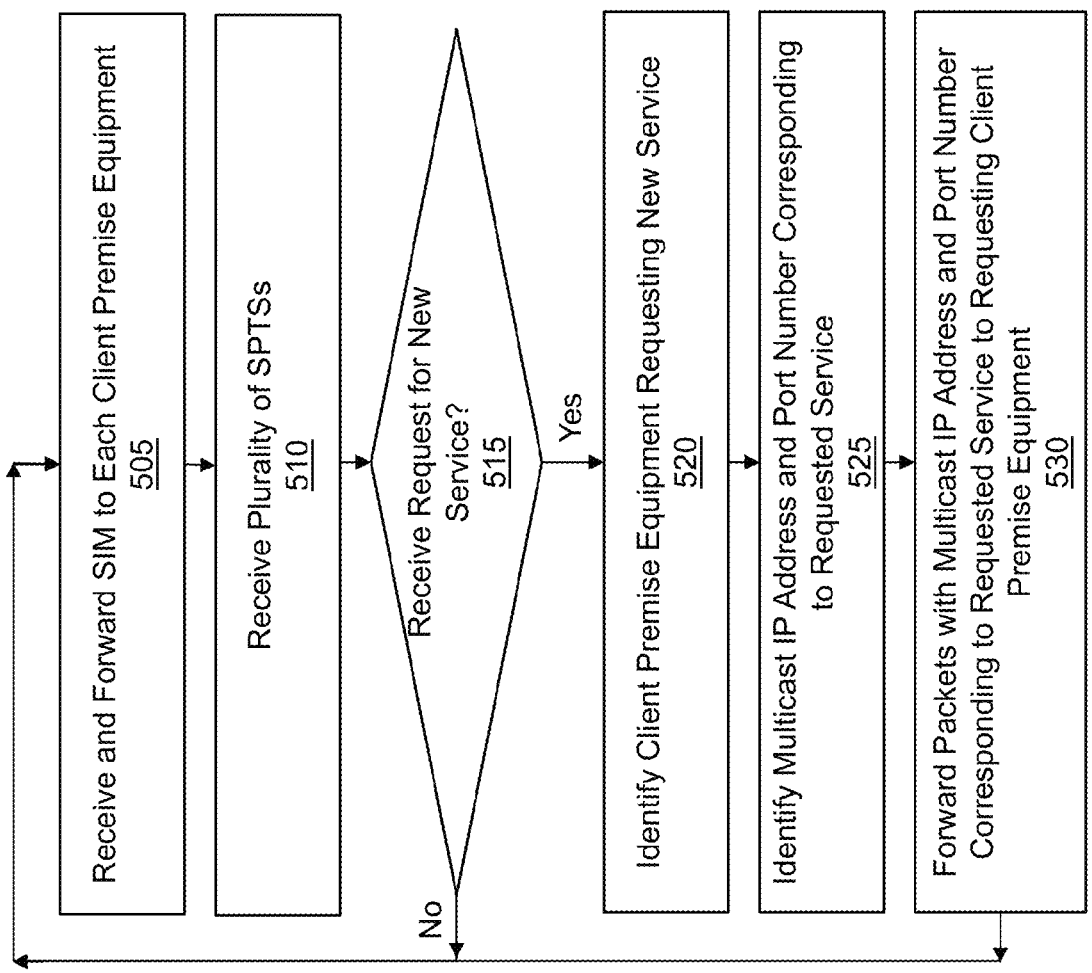
FIG. 5 is a flow diagram of an exemplary method for a switch in accordance with the present invention.
Figure 6:
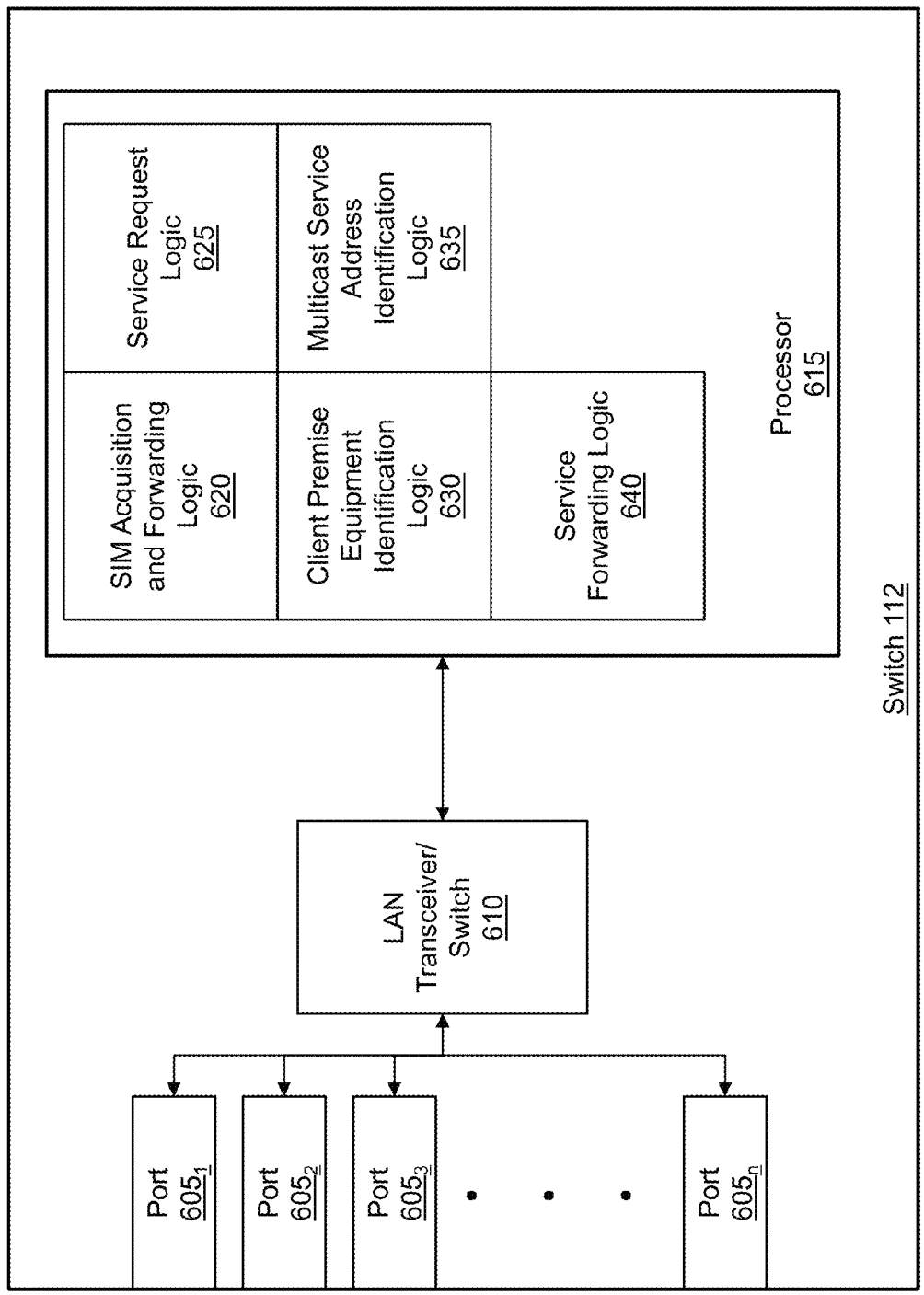
FIG. 6 is a block diagram of an exemplary switch in accordance with the present invention.

FIG. 5 is a flow diagram of an exemplary method for a switch in accordance with the present invention and FIG. 6 is a block diagram of an exemplary switch in accordance with the present invention. Referring first to FIG. 6, switch 112 includes a plurality of ports $605_1$-$605_n$ that are coupled to the satellite receiver gateway 105 and the plurality of client premise equipment 111. For all conventional packets that do not relate to the DVB program distribution, LAN transceiver/switch will operate in a conventional manner to properly route packets between satellite receiver gateway 105 and the plurality of client premise equipment 111, and between client premise equipment 111, as appropriate. As will be described in more detail below, in one embodiment of the present invention the switch 112 operates in a so-called snooping mode to handle the DVB satellite programs so that all SPTSs are forwarded from the satellite receiver gateway 105 to the switch 112 and the switch forwards an SPTS for a requested program to the requesting client premise equipment 111. Although FIG. 6 illustrates a combined LAN transceiver and switch, these functions can be separated. Furthermore, the switch 112 can include separate LAN transceivers for each of the ports.

Processor 615 of switch 112 can be a microprocessor, application specific integrated circuit (ASIC), and/or a field programmable gate array (FPGA). When processor 615 is a microprocessor the various logic illustrated in FIG. 6 can be computer code stored in a non-transitory memory (not illustrated) that is loaded into the microprocessor.

Turning now to the operation of the switch 112 in connection with the operation of the DVB program distribution, switch 112 receives SIM multicast packets over one of the ports 605 and LAN transceiver/switch 610, and then uses logic 620 to control transmission of the SIM multicast packets to each of the client premise equipment 111 over the other ports (step 505). At the same time, switch 112 also receives a plurality of SPTSs corresponding to a plurality of programs over the same port 605 or other ports as the SIM multicast packets are received (step 510). When switch 112 receives packets from client premise equipment 111, logic 625 examines the packets to determine whether they are for a service request (step 515). When a packet received from a client premise equipment is not for a service request ("No" path out of decision step 515), the packets are routed in accordance with conventional procedures, and the switch 112 continues to receive and forward SIM multicast packets (step 505).

When logic 625 determines that a packet from a client premise equipment is a request for a new service ("Yes" path out of decision step 515), logic 630 identifies the client premise equipment requesting the new service (step 520). Logic 635 then identifies the multicast IP address and port number corresponding to the requested service (step 525) and logic 640 forwards packets that have the multicast IP address and port number for the requested service to the requesting client premise equipment (step 530).

Figure 7:
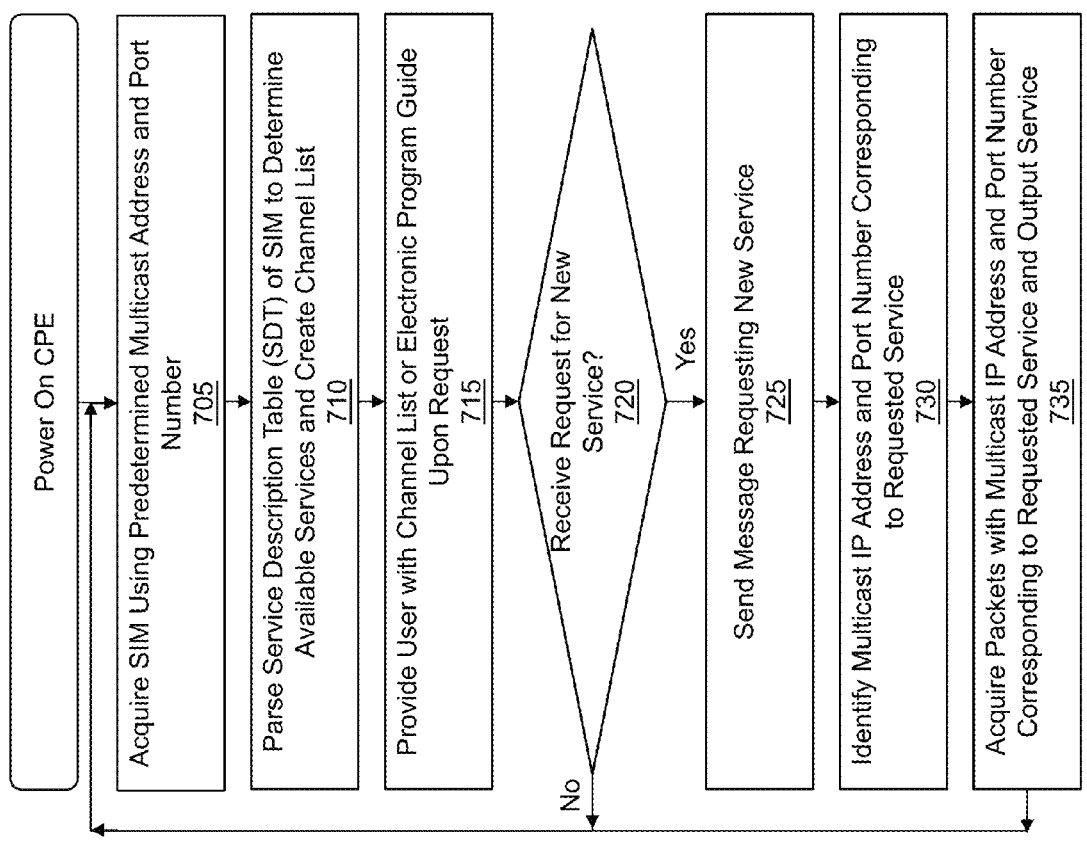
FIG. 7 is a flow diagram of an exemplary method for client premise equipment in accordance with the present invention.
Figure 8:
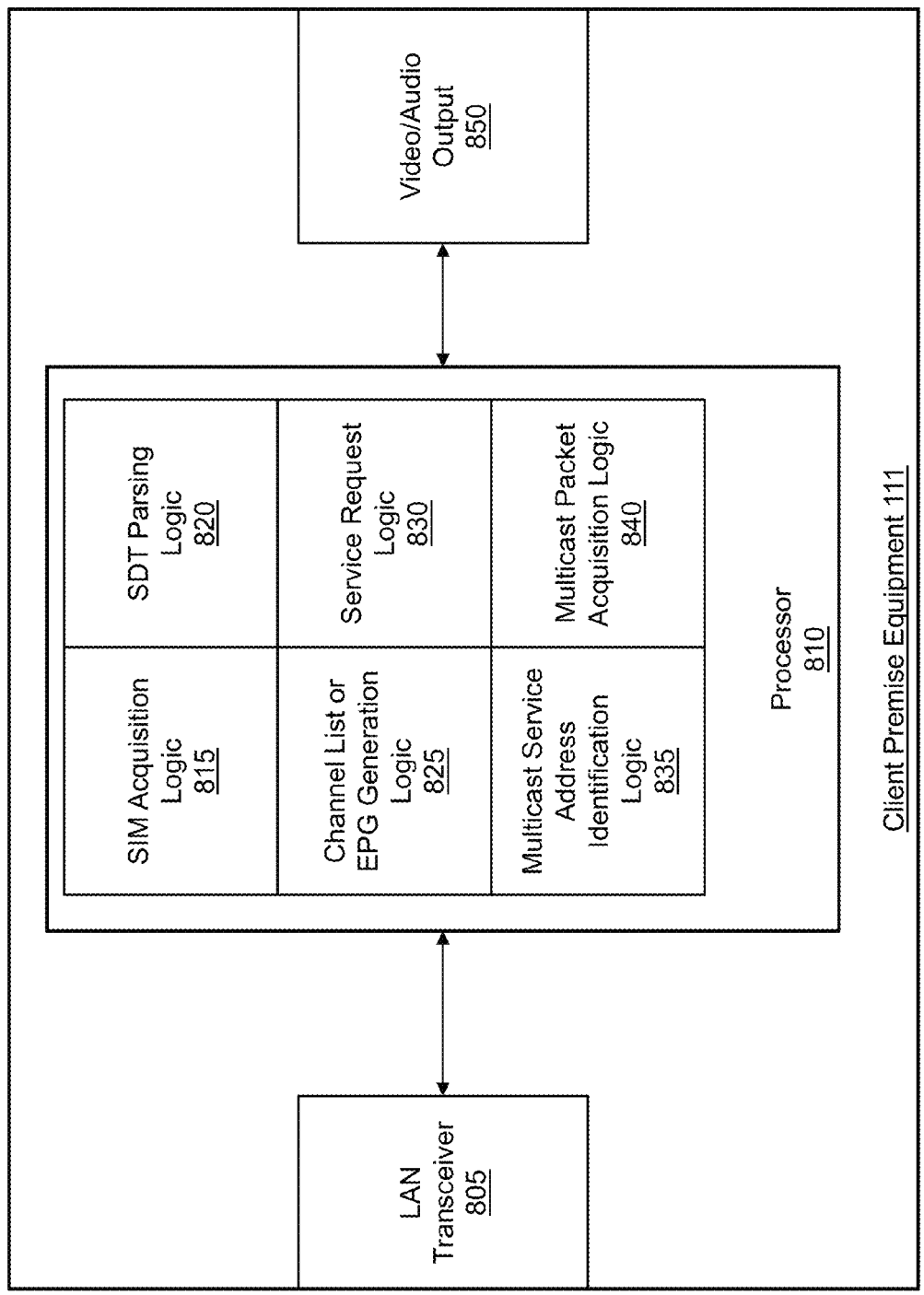
FIG. 8 is a block diagram of exemplary client premise equipment in accordance with the present invention.

FIG. 7 is a flow diagram of an exemplary method for client premise equipment in accordance with the present invention and FIG. 8 is a block diagram of exemplary client premise equipment in accordance with the present invention. When a client premise equipment (CPE) 111 is first powered on processor 810 receives packets from LAN transceiver 805 that are carried on the multicast distribution system 108 and logic 815 acquires the multicast packets of the SIM that are carried using a predetermined multicast address and port for this purpose (step 705). Logic 820 then parses the Service Description Table (SDT) to determine the available services and create a channel list (step 710). Logic 825 then generates a channel list or electronic program guide (EPG) upon request from a user (step 715), and then service request logic 830 determines whether a user has requested a new service (step 720).

If a new service has not been requested ("No" path out of decision step 720), then client premise equipment continues to acquire the multicast packets associated with the SIM (step 705). If a new service has been requested ("Yes" path out of decision step 720), then logic 830 sends a service request towards the satellite receiver gateway 105 via LAN transceiver 805 and multicast distribution system 108 (step 725). Because the switch uses a snooping technique, the request packet will be addressed to the satellite receiver gateway, but intercepted and processed by the switch 112, which will handle the service request. The service request can be formatted, for example, as an Internet Group Management Protocol (IGMP) join request message and the snooping technique can be an IGMP snooping technique. Using the predetermined algorithm, logic 835 identifies the multicast service address and port number for the requested service (step 730), and then logic 840 acquires and decodes the packets associated with the requested service and outputs video via audio/video output 850 (step 735).

Processor 810 of client premise equipment 111 can be a microprocessor, application specific integrated circuit (ASIC), and/or a field programmable gate array (FPGA). When processor 810 is a microprocessor the various logic illustrated in FIG. 8 can be computer code stored in a non-transitory memory (not illustrated) that is loaded into the microprocessor.

Although the embodiments described above employ a snooping technique by the switch 112, the present invention can also be implemented where the switch does not employ such a technique. In this case, the switch 112 will receive request packets from client premise equipment 111 and forward these packets to the satellite receiver gateway 105 for handling the request and providing the requested service. In this embodiment, satellite receiver gateway 105 will only forward SPTSs to the multicast distribution system 108 for programs that have been requested by a client premise equipment 111. If satellite receiver gateway 105 receives a request for a service from one client premise equipment that is already being provided to another client premise equipment, then satellite receiver gateway 105 can ignore the request except as may be required by normal well-known multicast techniques to track client premise equipment for the purpose of determining when to terminate forwarding that particular service whenever the satellite receiver gateway determines it is no longer in use by any client premise equipment. However, if the multicast distribution system 108 employs multiple switches and the one client and the another client are served by different switches, then satellite receiver gateway 105 will forward the SPTS to the switches serving each of the clients.

Those skilled in the art will recognize that the block diagrams of the satellite receiver gateway 105 in FIG. 4, switch 112 in FIG. 6, and the client premises equipment 111 in FIG. 8 illustrate only some of the components of these devices. In actual implementation, these devices can include other components, including memory (e.g., solid state, a hard drive, and/or the like), power supplies, user interface elements (e.g., buttons), etc.

It should be recognized that although the discussion above focuses on the distribution of video and audio signals that are part of transport streams transmitted by a DVB satellite, the present invention can also be used for distribution of other types of signals, including audio-only signals, data signals (e.g., related to web browsing, e-mail, etc.), IP telephony signals, and the like. Accordingly, in the discussion above the reference to a channel or program should be understood as equally applicable to other types of services that are carried in separate transport streams. Furthermore, in the discussion above the terms channel and program are used interchangeably and should be understood in the context of the present invention as representing the same concept. Moreover, the present invention is not limited to a particular type of DVB satellite transmission technique, and can include DVB-S, DVB-S2, and the forthcoming DVB-S3. Indeed, the present invention is not limited to DVB satellite transmission techniques. Rather, the present invention can be employed with any type of transmission technique of digital satellite broadcast programs.

Although exemplary embodiments have been described in connection with client premise equipment, the present invention can be used with any type of device, including fixed and/or mobile devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of distributing digital satellite broadcast programs, comprising:

receiving, by a satellite receiver gateway, a digital satellite broadcast signal;

demodulating and demultiplexing, by the satellite receiver gateway, the digital satellite broadcast signal into a multiple program transport stream;

extracting, by the satellite receiver gateway, service information from the multiple program transport stream;

generating, by the satellite receiver gateway, a plurality of unsolicited service information multicast packets having a predetermined multicast address and port number;

extracting, by the satellite receiver gateway, a complex program allocation table from the multiple program transport stream;

generating, by the satellite receiver gateway, a simplified program allocation table for each service within the multiple program transport stream, using the extracted complex program allocation table;

extracting, by the satellite receiver gateway, a complex program map table from the multiple program transport stream;

generating, by the satellite receiver gateway, a simplified program map table for each service within the multiple program transport stream using the extracted complex program map table; and transmitting, by the satellite receiver gateway, a plurality of multicast packets to a plurality of devices over an internet protocol IP local area network wherein the plurality of multicast packets comprise one or more groupings of packets, each grouping associated with a single program transport stream, each single program transport stream corresponding to a service within the multiple program transport stream, each grouping including the simplified program allocation table and the simplified program map table corresponding to the service, and the plurality of unsolicited service information multicast packets.

2. The method of claim 1, further comprising:

receiving, from one of the plurality of devices, a request for a service identified in one of the plurality of unsolicited service information multicast packets, and in response to receipt of the request generating a single program transport stream for the requested service; and transmitting, a grouping of packets associated with the generated single program transport stream to the one of the plurality of devices over the IP local area network, the grouping including a simplified program allocation table corresponding to the requested service, a simplified program map table corresponding to the requested service, and the requested service itself.

3. The method of claim 2, wherein a switch is arranged in the IP local area network between the satellite receiver gateway and the plurality of devices, and the switch receives the request for the service and transmits the grouping of packets to the one of the plurality of devices.

4. The method of claim 2, wherein the satellite receiver gateway uses information in the simplified program map table to allocate video, audio, program clock references, and entitlement control messages to the requested service for transmission in the grouping of packets corresponding to the requested service.

5. The method of claim 2, wherein the one of the plurality of devices:

receives the plurality of unsolicited service information multicast packets;

generates and outputs either a channel list or an electronic program guide;

receives a request for a service; and transmits the service request to the satellite receiver gateway.

6. The method of claim 1, wherein the plurality of unsolicited service information multicast packets include a conditional access table, a service description table, an event information table, a time data table, a time offset table, and software update data.

7. The method of claim 1, wherein the groupings of packets associated with the single program transport streams are distinct from the unsolicited SIM packets.

8. A method of receiving digital satellite broadcast programs, comprising:

receiving, by a device from a satellite receiver gateway, a plurality of multicast packets over an internet protocol (IP) local area network, wherein the plurality of multicast packets comprise one or more groupings of packets, each grouping associated with a single program transport stream, program transport stream corresponding to a service, and a plurality of unsolicited service information multicast packets;

generating, by the device, either a channel list or an electronic program guide based on information in the plurality of unsolicited service information multicast packets;

receiving, by the device, a request for a service listed in either of the channel list or electronic program guide;

transmitting, by the device to the satellite receiver gateway, the request for the service;

determining, by the device, a multicast IP address using information contained in the unsolicited service information multicast packets; and receiving, by the device, the requested service, wherein the receipt of the requested service is performed by identifying packets on the local area network that include the determined multicast IP address.

9. The method of claim 8, wherein the request is addressed to the satellite receiver gateway and a switch in the IP local area network services the request for service by providing the requested service without forwarding the request to the satellite receiver gateway.

10. The method of claim 8, wherein the request is addressed to satellite receiver gateway and a switch in the IP local area network forward the request to the satellite receiver gateway to service the request.

11. The method of claim 8, wherein the plurality of unsolicited service information multicast packets include a conditional access table, a service description table, an event information table, a time data table, a time offset table, and software update data.

12. The method of claim 8, wherein the groupings of packets associated with the single program transport streams are distinct from the unsolicited SIM packets.

13. A satellite receiver gateway, comprising:

a receiver to receive a digital satellite broadcast signal;

a demodulator to demodulate the received digital satellite broadcast signal;

a demultiplexer to demultiplex multiple program transport streams in the demodulated digital satellite broadcast signal;

logic to extract service information from one of the demultiplexed multiple program transport streams;

logic to generate a plurality of unsolicited service information multicast packets having a predetermined multicast address and port number; and logic to extract a complex program allocation table from the multiple program transport stream and generate a simplified program allocation table for each service within the multiple program transport stream using the complex program allocation table;

logic to extract a complex program map table from the multiple program transport stream and generate a simplified program map table for each service within the multiple program transport stream using the complex program map table; and a transceiver to transmit a plurality of multicast packets to a plurality of devices over an internet protocol (IP) local area network, said plurality of multicast packets comprising one or more groupings of packets, each grouping associated with a single program transport stream, each single program transport stream corresponding to a service within the multiple program transport stream, and the plurality of unsolicited service information multicast packets.

14. The satellite receiver gateway of claim 13, wherein the transceiver receives a request for a service identified in one of the plurality of unsolicited service information multicast packets from one of the plurality of devices, and the satellite receiver gateway further comprises logic to generate a single program transport stream for the requested service, wherein the transceiver transmits a grouping of packets associated with the generated single program transport stream over the IP local area network, the grouping including the simplified program allocation table corresponding to the requested service, the simplified program map table corresponding to the requested service, and the requested service itself.

15. The satellite receiver gateway of claim 13, further comprising:

logic to generate the one or more groupings of packets;

wherein the transceiver transmits the one or more groupings of packets to a switch of the IP local area network, and wherein the switch receives a request for a service identified in one of the plurality of unsolicited service information multicast packets from one of the plurality of devices and transmit a grouping of packets associated with the single program transport stream corresponding to the requested service over the IP local area network, the grouping including the simplified program allocation table corresponding to the requested service, simplified program map table corresponding to the requested service, and the requested service itself.

16. The satellite receiver gateway of claim 13, wherein the logic to extract service information from one of the demultiplexed multiple program transport streams uses information in the simplified program map table for one of the services to allocate video, audio, program clock references, and entitlement control messages to the service for transmission in the grouping of packets associated with the single program transport stream corresponding to the one of the services.

17. The satellite receiver gateway of claim 13, wherein the plurality of unsolicited service information multicast packets include a conditional access table, a service description table, an event information table, a time data table, a time offset table, and software update data.

18. The satellite receiver gateway of claim 13, wherein the groupings of packets associated with the single program transport streams are distinct from the unsolicited SIM packets.

* * * * *